(12) United States Patent
Smith (10) Patent No.: US 11,638,901 B2
(45) Date of Patent: May 2, 2023

(54) SYSTEMS AND METHODS FOR MANAGING HYDROCARBON EMISSIONS

(71) Applicant: Stevie Horton Smith, Seabrook, TX (US)

(72) Inventor: Stevie Horton Smith, Seabrook, TX (US)

( * ) Notice: Subject to any disclaimer, the term of this patent is extended or adjusted under 35 U.S.C. 154(b) by 278 days.

(21) Appl. No.: 16/832,580

(22) Filed: Mar. 27, 2020

(65) Prior Publication Data

US 2020/0306690 A1    Oct. 1, 2020

Related U.S. Application Data

(60) Provisional application No. 62/825,497, filed on Mar. 28, 2019.

(51) Int. Cl.
| | |
|---|---|
| *B01D 53/75* | (2006.01) |
| *B01D 53/00* | (2006.01) |
| *B01D 53/86* | (2006.01) |
| *B01D 53/26* | (2006.01) |

(52) U.S. Cl.
CPC ........... *B01D 53/75* (2013.01); *B01D 53/005* (2013.01); *B01D 53/26* (2013.01); *B01D 53/864* (2013.01); *B01D 53/8696* (2013.01); *B01D 2256/12* (2013.01); *B01D 2256/22* (2013.01); *B01D 2257/702* (2013.01); *B01D 2257/80* (2013.01); *B01D 2258/02* (2013.01); *B01D 2259/122* (2013.01)

(58) Field of Classification Search
CPC ...... B01D 53/75; B01D 53/005; B01D 53/26; B01D 53/864; B01D 53/8696; B01D 2256/12; B01D 2256/22; B01D 2257/702; B01D 2257/80; B01D 2258/02; B01D 2259/122
USPC ...................................... 423/245.3
See application file for complete search history.

(56) References Cited

U.S. PATENT DOCUMENTS

| | | | | |
|---|---|---|---|---|
| 5,451,385 | A | * | 9/1995 | Hansel .............. B01D 53/9409 423/213.2 |
| 2009/0250038 | A1 | * | 10/2009 | Xu .................... F02M 63/0245 123/457 |
| 2015/0068295 | A1 | * | 3/2015 | Kowalkowski ....... F01N 11/002 73/114.75 |

(Continued)

*Primary Examiner* — Anita Nassiri-Motlagh
(74) *Attorney, Agent, or Firm* — Conley Rose, P.C.

(57) ABSTRACT

A system for reducing the release of hydrocarbons emitted from a hydrocarbon source into the atmosphere includes a hydrocarbon supply conduit configured to receive the emitted hydrocarbons. In addition, the system includes an air supply conduit coupled to an air source. Further, the system includes a combustion device coupled to an outlet end of the hydrocarbon supply conduit and an outlet end of the air supply conduit. The combustion device is configured to receive the hydrocarbons from the hydrocarbon supply conduit and the air from the air supply conduit, and combust the hydrocarbons. Still further, the system includes a catalytic converter spaced apart from the combustion device and a transfer conduit extending from an outlet of the combustion device to an inlet of a catalytic converter. The catalytic converter is configured to receive the combustion products and any un-combusted hydrocarbons from the transfer conduit, and oxidize the un-combusted hydrocarbons.

12 Claims, 4 Drawing Sheets

(56) References Cited

U.S. PATENT DOCUMENTS

2016/0177805 A1\* 6/2016 Achiwa .................. F01N 13/10
60/323
2016/0230730 A1\* 8/2016 Merchant ............. F02M 61/182
2018/0363579 A1\* 12/2018 Ogata ................. F02D 41/0255
2019/0017457 A1\* 1/2019 Fujimoto ............. F01L 1/3442

\* cited by examiner

SYSTEMS AND METHODS FOR MANAGING HYDROCARBON EMISSIONS

CROSS-REFERENCE TO RELATED APPLICATIONS

This application claims benefit of U.S. provisional patent application Ser. No. 62/825,497 filed Mar. 28, 2019, and entitled "Systems and Methods for Managing Hydrocarbon Emissions," which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to systems and methods for reducing and/or preventing the release of hydrocarbon emissions such as methane into the atmosphere. More particularly, this disclosure relates to systems and methods for combusting hydrocarbon emissions to reduce and/or eliminate fugitive emissions.

Hydrocarbon production systems (both actively producing and abandoned), hydrocarbon fluid analyzers, petrochemical plants, refineries, and other industrial activities may intermittently or continuously emit hydrocarbons to the surrounding environment, which may present environmental hazards. For example, wellheads and other equipment utilized for producing hydrocarbons from wells traversing subterranean earthen formations present a potential leak source of hydrocarbons in the upstream environment.

In many jurisdictions, environmental regulations may limit and/or prevent the emission of hydrocarbons into the environment, even in relatively small trace quantities. For instance, some jurisdictions may require active monitoring of potential leak points to ensure that any hydrocarbons emitted to the surrounding environment are identified and mitigated.

BRIEF SUMMARY OF THE DISCLOSURE

Embodiments of systems for reducing the release of hydrocarbons intermittently or continuously emitted from a hydrocarbon source into the atmosphere are disclosed herein. In one embodiment, the system comprises a hydrocarbon supply conduit having an inlet end configured to receive the emitted hydrocarbons from the hydrocarbon source and an outlet end. In addition, the system comprises an air supply conduit having an inlet end configured to be coupled to an air source and an outlet end. Further, the system comprises a combustion device coupled to the outlet end of the hydrocarbon supply conduit and the outlet end of the air supply conduit. The combustion device is configured to receive the hydrocarbons from the hydrocarbon supply conduit and the air from the air supply conduit. The combustion device is configured to ignite and combust the hydrocarbons. The system also comprises a catalytic converter spaced apart from the combustion device. Moreover, the system comprises a transfer conduit extending from an outlet of the combustion device to an inlet of a catalytic converter. The catalytic converter is configured to receive the combustion products and any un-combusted hydrocarbons from the transfer conduit. The catalytic converter includes a catalyst configured to oxidize the un-combusted hydrocarbons.

Embodiments of system for reducing the release of hydrocarbons intermittently or continuously emitted from a hydrocarbon source into the atmosphere are disclosed herein. In one embodiment, the system comprises a hydrocarbon supply conduit having an inlet end configured to receive the emitted hydrocarbons from the hydrocarbon source and an outlet end. In addition, the system comprises a first flow meter and a first choke valve disposed along the hydrocarbon supply line, wherein the first flow meter is positioned between the first choke valve and the outlet end of the hydrocarbon supply conduit. Further, the system comprises an air supply conduit having an inlet end configured to be coupled to an air source and an outlet end. Still further, the system comprises a second flow meter and a second choke valve disposed along the air supply line. The second flow meter is positioned between the second choke valve and the outlet end of the air supply conduit. Moreover, the system comprises a combustion device coupled to the outlet end of the hydrocarbon supply conduit and the outlet end of the air supply conduit. The combustion device is configured to receive the hydrocarbons from the hydrocarbon supply conduit and the air from the air supply conduit. The combustion device is configured to ignite and combust the hydrocarbons. The system also comprises a catalytic converter coupled to the combustion device. The catalytic converter is configured to receive the combustion products and any un-combusted hydrocarbons from the combustion device. The catalytic converter includes a catalyst configured to oxidize the un-combusted hydrocarbons. The first flow meter is configured to measure a flow rate of the hydrocarbons in the hydrocarbon supply conduit and the second flow meter is configured to measure a flow rate of the air in the air supply conduit. The first choke valve is configured to be adjusted to control the flow rate of the hydrocarbons in the hydrocarbon supply conduit and the second choke valve is configured to be adjusted to control the flow rate of the air in the air supply conduit to achieve a pre-determined air-to-fuel ratio of the hydrocarbons and the air in the combustion device.

Embodiments of methods for reducing the release of hydrocarbons intermittently or continuously emitted from a hydrocarbon source into the atmosphere are disclosed herein. In one embodiment, the method comprises (a) flowing the hydrocarbons to a combustion device. In addition, the method comprises (b) flowing air comprising oxygen to the combustion device. Further, the method comprises (c) substantially combusting the hydrocarbons and oxygen in the combustion device to produce combustion products, un-combusted hydrocarbons, and un-combusted oxygen. Still further, the method comprises (d) flowing the combustion products, the un-combusted hydrocarbons, and the un-combusted oxygen from the combustion device to a catalytic converter. The method also comprises (e) oxidizing the un-combusted hydrocarbons with the catalytic converter. Moreover, the method comprises (f) measuring the flow rate of hydrocarbons to the combustion device and measuring the flow rate of air to the combustion device during (a) and (b). The method also comprises (g) adjusting the flow rate of hydrocarbons to the combustion device or adjusting the flow rate of air to the combustion device during (f) to achieve a pre-determined air-to-fuel ratio.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of the disclosed embodiments, reference will now be made to the accompanying drawings in which.

DETAILED DESCRIPTION OF THE DISCLOSED EMBODIMENTS

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As previously described, a variety of industrial activities may produce intermittent or continuous hydrocarbon emissions that may require mitigation to reduce and/or eliminate the release of such hydrocarbon emissions to the atmosphere, and further, environmental regulations may limit and/or prevent the emission of hydrocarbons into the environment, even in trace quantities. For example, some environmental regulatory bodies such as the Environmental Protection Agency (EPA) require a vent control system when the release of fugitive hydrocarbon emissions is possible. In general, the purpose of the vent control system is to eliminate or significantly reduce the release of fugitive hydrocarbon emissions. While thermal oxidizers are available for vents that emit relatively large volumes of hydrocarbons (e.g., greater than 100 standard cubic feet per minute), vent control systems for relatively small volumes of hydrocarbons (e.g., less than 1.0 standard cubic foot per minute) are limited. For example, one conventional vent control system for eliminating undesirable hydrocarbon emissions employs a catalytic converter that is heated to a temperature sufficient to ignite and combust hydrocarbon emissions. However, such system is limited to relatively small quantities of intermittent fugitive emissions. For instance, one such conventional vent control system is limited to a maximum hydrocarbon flow rate of 1.0 liter per minute (~0.035 standard cubic feet per minute) with a maximum BTU throughput of 750 BTU per hour. However, due to limited (if any) diagnostics to ensure the system is operating properly, a user may inadvertently exceed the maximum flow rate (1.0 liter per minute) and/or the BTU throughput (750 BTU per hour). Exceeding either of these operational parameters may result in damage to the system and/or the system not performing its intended purpose. Thus, although such conventional vent control systems can be used to combust fugitive hydrocarbon emissions, they are generally less suitable for dealing with continuous hydrocarbon emissions and/or larger quantities of hydrocarbon emissions due to limitations in volumetric and heat throughput. If additional capacity is desired, multiple systems may need to be installed, which potentially increases costs and the complexity of the infrastructure (e.g., plumbing) to route the emissions to multiple systems. In addition, due to limited (if any) diagnostics to monitor the performance of the catalyst in such conventional systems, the catalyst is often replaced on a periodic basis regardless of the actual remaining useful operating lifetime of the catalyst. To reduce the potential for undesirably releasing hydrocarbon emissions into the atmosphere, the catalyst may often be replaced at an overly frequent rate, which undesirably increases operating costs and the frequency at which the associated industrial activity that is producing the hydrocarbon emissions must be shut down to replace the catalyst.

Accordingly, embodiments of hydrocarbon emission mitigation systems and methods described herein are designed and configured to accommodate relatively large throughputs of hydrocarbon emissions, and further, include "smart" features for monitoring catalyst performance and enhancing combustion of the hydrocarbon emissions.

Figure 1:
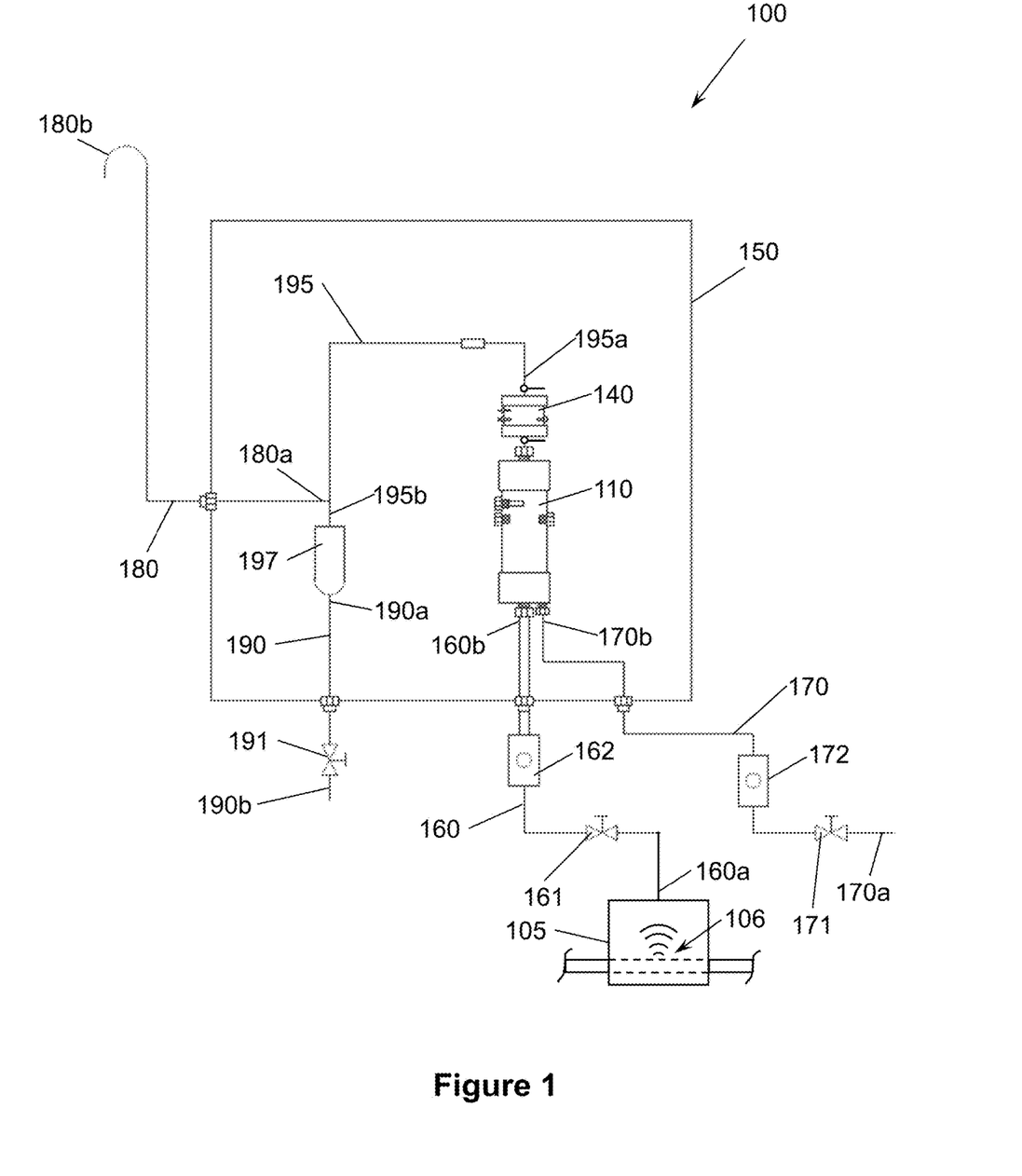
FIG. 1 is a schematic view of an embodiment of a hydrocarbon emission management system in accordance with principles disclosed herein.

Referring now to FIG. 1, an embodiment of a hydrocarbon emissions mitigation system 100 is shown. System 100 is coupled to a containment device 105 disposed about a source 106 of intermittent and/or continuous hydrocarbon emissions. In general, system 100 can be used to mitigate the release of hydrocarbons from any potential source of intermittent and/or continuous hydrocarbon emissions including, without limitation, fluid conduits, storage vessels, containers, hydrocarbon production equipment (e.g., wellheads), and the like. In the embodiment shown in FIG. 1, source 106 is a pipeline.

In this embodiment, system 100 includes a hydrocarbon combustion device 110, a catalytic converter 140 coupled to the combustion device 110, an air supply conduit 170 coupled to combustion device 110, a hydrocarbon gas supply conduit 160 coupled to combustion device 110, a gas outlet conduit 180 coupled to catalytic converter 140, and a liquids outlet conduit 190 coupled to catalytic converter 140. Hydrocarbon gas supply conduit 160 supplies the intermittent and/or continuous stream of hydrocarbon emissions to combustion device 110, and air supply conduit 170 supplies pressurized air (including oxygen) to combustion device 110. As shown in FIG. 1, hydrocarbon gas supply conduit 160 has a first or inlet end 160a coupled to containment structure 105 and a second or outlet end 160b coupled to combustion device 110. An adjustable choke valve 161 is disposed along hydrocarbon gas supply conduit 160 and a flow meter 162 is disposed along conduit 160 between valve 161 and outlet end 160b. As will be described in more detail below, choke valve 161 can be selectively adjusted to alter and control the volumetric flow rate of hydrocarbons through conduit 170 and into combustion device 110. Flow meter 162 is downstream of choke valve 161 and measures the volumetric flow rate of hydrocarbons through conduit 170 and into combustion device 110. In general, flow meter 161 can be any suitable flow meter known in the art for measuring the volumetric flow rate of gaseous hydrocarbons through a conduit or pipe, and choke valve 161 can be any suitable choke valve known in the art for controllably and selectively adjusting the volumetric flow rate of gaseous hydrocarbons through a conduit or pipe.

As noted above, the inlet end 160a of hydrocarbon gas supply conduit 160 is coupled to containment structure 105, which is disposed about source 106. In general, containment structure 105 can be any device or structure that can be placed around the source 106 to capture and contain hydrocarbons emitted from source 106. For example, containment structure 105 can be a tent or hard-sided enclosure disposed about the source 106. As will be described in more detail below, the emitted hydrocarbons captured in containment structure 105 are directed into inlet 160a.

Air supply conduit 170 has a first or inlet end 170a coupled to a source of air (not shown) and a second or outlet end 170b coupled to combustion device 110. An adjustable choke valve 171 is disposed along air supply conduit 170 and a flow meter 172 is disposed along conduit 170 between valve 171 and outlet end 170b. In this embodiment, the source of air coupled to inlet end 170a is a pressurized source of air (e.g., air supplied at a pressure greater than atmospheric pressure). For example, the source of pressurized air may be an air pump or a blower. In some embodiments utilizing an air pump or blower, the air pump or blower may be positioned to generate a slightly negative pressure (i.e., pressure slightly less than atmospheric) in containment structure 105 (e.g., within containment structure 105). The slightly negative pressure generated by the pump or blower in containment structure 105 may aid in keeping the emitted hydrocarbons within containment structure 105, thereby preventing their release into the surrounding environment, and allowing them to be directed into the inlet 160a of conduit 160. In such embodiments, the pump or blower is preferably positioned to generate the negative pressure within containment structure 105 but not direct the emitted hydrocarbons into inlet 170a and air conduit 170. For example, if source 106 emits light hydrocarbons that rise in air, then the pump or blower can be positioned below source 106 such that the emitted hydrocarbons are permitted to rise within containment structure 105 to inlet 160a coupled to an upper end of containment structure 105.

As will be described in more detail below, choke valve 171 can be selectively adjusted to alter and control the volumetric flow rate of air through conduit 170 and into combustion device 110. Flow meter 172 is downstream of choke valve 171 and measures the volumetric flow rate of air through conduit 170 and into combustion device 110. In general, flow meter 171 can be any suitable flow meter known in the art for measuring the volumetric flow rate of air through a conduit or pipe, and choke valve 171 can be any suitable choke valve known in the art for controllably and selectively adjusting the volumetric flow rate of air through a conduit or pipe.

Referring still to FIG. 1, a fluids outlet conduit 195 extends from catalytic converter 140 to gas outlet conduit 180 and liquids outlet conduit 190. More specifically, fluids outlet conduit 195 has a first or inlet end 195a coupled to catalytic converter 140 and a second or outlet end coupled to conduits 180, 190.

As will be described in more detail below, the hydrocarbons and oxygen in the air supplied to combustion device 110 are mixed and combusted within combustion device 110. The hydrocarbons, oxygen, and other components of air (e.g., nitrogen) that survive combustion within device 110 (e.g., in the case of incomplete combustion) and the combustion products (e.g., carbon dioxide and water vapor) flow from combustion device 110 to catalytic converter 140. The surviving hydrocarbons are oxidized in catalytic converter 140, and the remaining fluids (e.g., carbon dioxide, water, oxygen, and any other components of air) pass through and exit catalytic converter 140 into fluids outlet conduit 195. The fluids in outlet conduit 195 are divided into liquids and gases—the gases exit system 100 via gas outlet conduit 180 and the liquids exiting system 100 via liquids outlet conduit 190.

It is to be understood that the air supplied to system 100 includes oxygen (about 21 vol %), nitrogen (about 78 vol %), and small amounts of a variety of other gases (e.g., argon, carbon dioxide, water vapor, etc.). The oxygen in the air combusts with the hydrocarbons in the combustion device 110, however, the remaining constituents (e.g., nitrogen, argon, carbon dioxide, water vapor, etc.) pass through combustion device 110 and catalytic converter 140 substantially unchanged. As will be described in more detail below, the combustion products produced in combustion device 110 include carbon dioxide and water vapor. Those combustion products generally mix with the remaining constituents of the air and pass through catalytic converter 140 along with any un-combusted hydrocarbons and un-combusted oxygen (if any). For purposes of clarity and further explanation, the constituents of air other than oxygen will generally be disregarded with the understanding they flow along with the combustion products through catalytic converter 140 and the other components of system 100 downstream of catalytic converter 140.

As shown in FIG. 1, in this embodiment, combustion device 110, catalytic converter 140, and fluids outlet conduit 195 are disposed within a housing 150 that protects and limits access to these components. Housing 150 enables system 100 to be safely located and operated in a National Electric Code Area Classification of Class 1, Division 1 area. In this embodiment, housing 150 is an explosion proof enclosure available from Adelat, a ScottFetzer Company, of Cleveland, Ohio. Conduits 170, 160 extend though housing 150 to combustion device 110 disposed therein, and conduits 180, 190 extend through housing 150 from conduit 195 disposed therein.

Figure 2:
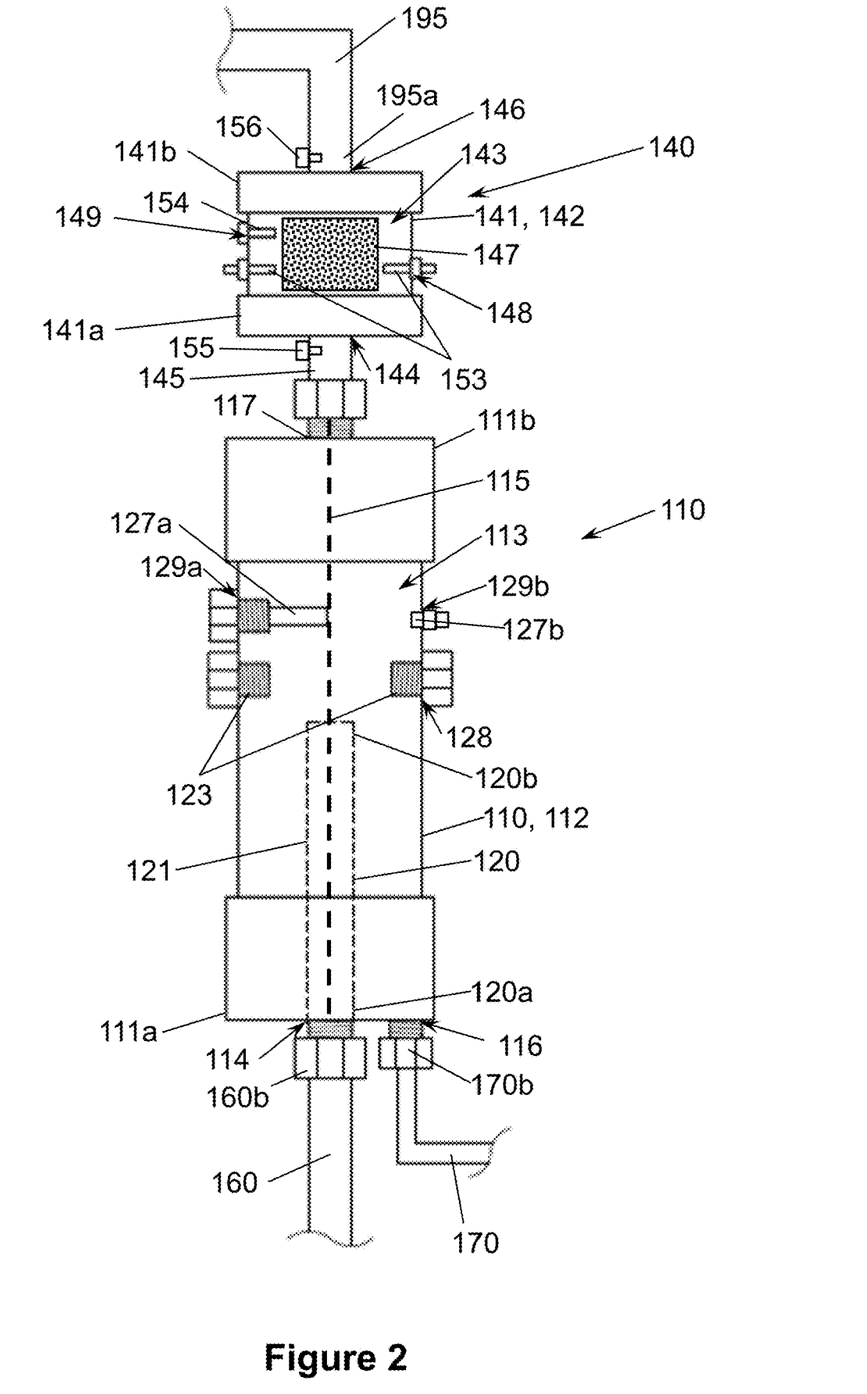
FIG. 2 is an enlarged schematic side view of the combustion device and catalytic converter of FIG. 1.

Referring now to FIG. 2, combustion device 110 includes an outer body or housing 111, a perforated gas diffuser 120 disposed within housing 111, a pair of ignitors 123 extending into housing 111, a temperature sensor 127*a* extending into housing 111, and an optical flame detector 127*b* extending into housing 111. In this embodiment, housing 111 is generally cylindrical and has a central or longitudinal axis 115, a first end 111*a*, a second end 111*b* axially opposite end 111*a*, and a radially outer wall 112 extending axially between ends 111*a*, 111*b*. Closed ends 111*a*, 111*b* and outer wall 112 define an inner chamber 113 within housing 111 that extends axially between ends 111*a*, 111*b*. In this embodiment, housing 111 and axis 115 are vertically oriented with end 111*a* positions below end 111*b*. Thus, end 111*a* may also be referred to as lower end 111*a* and end 111*b* may also be referred to as upper end 111*b*.

Housing 111 includes a gas inlet port 114 in end 111*a*, an air inlet port 116 in end 111*a*, and an outlet port 117 in end 111*b*. As will be described in more detail below, the air and hydrocarbons supplied by conduits 170, 160 enter housing 111 at end 111*a* via inlet ports 114, 116, respectively; the hydrocarbons and air undergo combustion within chamber 113; and combustion products, as well as any un-combusted hydrocarbons and air, exit housing 111 at end 111*b* via outlet port 117 and pass into catalytic converter 140. Accordingly, end 111*a* may also be referred to as the inlet or upstream end of housing 111, end 111*b* may also be referred to as the outlet or downstream end of housing 111, and inner chamber 113 may also be referred to as a combustion chamber. Housing 111 is made of a rigid, durable material capable of withstanding exposure to hydrocarbons and combustion within chamber 113. In this embodiment, housing 111 is made of a 316 stainless steel tubular pipe with 316 stainless steel end caps fixably attached to the ends of the pipe.

Referring still to FIG. 2, outlet end 160*b* of gas supply conduit 160 is coupled to end 111*a* of housing 111 via gas inlet port 114 and outlet end 170*b* of air supply conduit 170 is coupled to end 111*a* of housing 111 via inlet port 116. In this embodiment, ends 160*b*, 170*b* are threaded into ports 114, 116, respectively. Diffuser 120 is an elongate cylindrical tubular fixably attached to outlet end 160*b* of gas supply conduit 160 and extending coaxially through combustion chamber 113. Diffuser 120 has an open first or inlet end 120*a* that receives hydrocarbon emissions from gas supply conduit 160 via outlet end 160*b*, a closed end 120*b* opposite end 130*a*, and a perforated sidewall 121 extending axially between ends 120*a*, 120*b*. Hydrocarbons flow from conduit 160 into diffuser 120 via ends 160*b*, 120*a*, and then flow radially outward through the perforations in sidewall 121 of diffuser 120 into combustion chamber 113. In general, the diameter of the diffuser 120 and the size of the perforations in sidewall 121 of diffuser 120 are selected based on the composition of the emitted hydrocarbons (e.g., ethane, propane, butane, etc.) and the flow rate of the emitted hydrocarbons to combustion device 110. Air flowing through air supply conduit 170 exits directly into combustion chamber 113 via end 170*b*. Thus, air from supply conduit 170 does not pass through diffuser 120.

Housing 111 also includes an ignitor port 128 for each ignitor 123, a sensor port 129*a* for temperature sensor 127*a*, and a detector port 129*b* for optical flame detector 127*b*. In this embodiment, ports 128, 129*a*, 129*b* extend radially through outer wall 112 with port 129*a*, 129*b* being axially positioned between ignitor ports 128 and end 111*b*. Ignitors 123, temperature sensor 127*a*, and optical flame detector 127*b* extend through ports 128, 129*a*, 129*b*, respectively, into chamber 113 with temperature sensor 127*a* and optical flame detector 127*b* positioned downstream of ignitors 123. In this embodiment, ignitors 123, temperature sensor 127*a*, and optical flame detector 127*b* are threaded into ports 128, 129*a*, 129*b*, respectively, thereby fixably securing ignitors 123, sensor 127*a*, and detector 127*b* to housing 111. In general, temperature sensor 127*a* can be any suitable device known in the art for measuring the temperature in combustion chamber 113 including, without limitation, a resistance temperature detector (RTD), a thermocouple, or the like; optical flame detector 127*b* can be any detector known in the art for optically detecting the presence of a flame in combustion chamber 112 including, without limitation, an ultra-violet sensor, an infrared sensor, a visible light sensor, or the like. In this embodiment, optical flame detector 127*b* comprises a terminal end of a fiber optic cable in a protective fitting and extending into chamber 113. The fiber optic cables is routed from chamber 113 to a photocell or Light Dependent Resistor (LDR) in a control system such as control system 300 described in more detail below. In embodiments relying on a photocell, if no flame is present in chamber 113, there is no visible light and the photo cell output is 0 V DC, whereas if a flame is present within chamber 113, the photocell will output a voltage increase such as rise of about 200 to 900 mV DC. In embodiments relying on an LDR, if there is no visible light, the resistance will be very high such as greater than 10K ohms, whereas if a flame is present within chamber 113, the resistance will drop such as a reduction to less than 2K ohms. The signal output by the photocell or LDR is monitored by the control system. In general, the presence of a flame in chamber 113 can be more quickly detected by an optical flame derector (e.g., detector 127*b*) than simply monitoring temperature within chamber 113. Each ignitor 123 can be any suitable device known in the art for igniting the mixture of hydrocarbons and oxygen in combustion chamber 113 including, without limitation, a glowplug, spark plug, arcing device, or the like.

Referring still to FIG. 2, catalytic converter 140 includes an outer body or housing 141, a pair of heaters 153 extending into housing 141, and a temperature sensor 154 extending into housing 141. In this embodiment, housing 141 is generally cylindrical and has a first end 141*a*, a second end 141*b* axially opposite end 141*a*, and a radially outer wall 142 extending between ends 141*a*, 141*b*. In this embodiment, housing 141 is vertically oriented with end 141a positions below end 141b. Thus, end 141a may also be referred to as lower end 141a and end 141b may also be referred to as upper end 141b. Closed ends 141a, 141b and outer wall 142 define an inner chamber 143 within housing 141 that extends axially between ends 141a, 141b. A catalyst 147 is disposed within chamber 143. As will be described in more detail below, catalyst 147 oxidizes hydrocarbons at a temperature less than the combustion temperature of the hydrocarbons within combustion chamber 113. In general, catalyst 147 can comprise any suitable catalyst for oxidizing hydrocarbons including, without limitation, Pd-based catalysts, platinum based catalysts, and rhodium based catalysts.

Housing 141 includes an inlet port 144 in end 141a and an outlet port 146 in end 141b. As will be described in more detail below, combustion products, any un-combusted hydrocarbons, and any un-combusted oxygen exiting combustion device 110 enter housing 141 at end 141a via inlet port 144, the un-combusted hydrocarbons are oxidized by catalyst 147 within chamber 143, and the remaining combustion products and un-combusted oxygen exit housing 141 at end 141b via outlet port 146. Accordingly, end 141a may also be referred to as the inlet or upstream end of housing 141, end 141b may also be referred to as the outlet or downstream end of housing 141, and inner chamber 143 may also be referred to as a catalytic chamber or hydrocarbon absorption chamber. Housing 141 is made of a rigid, durable material capable of withstanding exposure to hydrocarbons and the catalytic processes within chamber 143. In this embodiment, housing 141 is made of a 316 stainless steel tubular pipe with 316 stainless steel end caps fixably attached to the ends of the pipe.

Referring still to FIG. 2, a transfer conduit 145 extends from outlet port 117 of combustion device 110 to inlet port 144 of catalytic converter 140 to provide fluid communication between chambers 113, 143. Conduit 145 has an inlet end coupled to housing 111 at end 111b via outlet port 117 and an outlet end coupled to housing 141 at end 141a via inlet port 144 of housing 141. In this embodiment, the inlet end of conduit 145 is threaded into outlet port 117 and the outlet end of conduit is fixably secured to end 141a. Thus, combustion products, any un-combusted hydrocarbons and any un-combusted oxygen exiting combustion chamber 113 of combustion device 110 flow through outlet port 117, conduit 145, and inlet port 144 into inner chamber 143 of catalytic converter 140.

Housing 141 also includes a heater port 148 for each heater 153 and a sensor port 149 for temperature sensor 154. In this embodiment, ports 148, 149 extend radially through outer wall 142 with sensor port 149 being axially positioned between heater ports 148 and end 141b. Heaters 153 and temperature sensor 154 extend through ports 148, 149, respectively, into chamber 143 with temperature sensor 154 positioned downstream of heaters 153. In this embodiment, heaters 153 and temperature sensor 154 are threaded into ports 148, 149, respectively, thereby fixably securing heaters 153 and sensor 154 to housing 141. In general, each heater 153 can be any suitable device known in the art for heating the fluids in chamber 143 to a temperature sufficient for oxidation of hydrocarbons in the presence of catalyst 147. One example of a suitable device that can be used for each heater 153 is the Hotwatt Cartridge Type heater available from Backer Hotwatt of Danvers, Mass. Temperature sensor 154 is the same as temperature sensor 127a previously described with respect to combustion device 110.

Referring still to FIG. 2, in this embodiment, a first or inlet oxygen sensor 155 is provided along conduit 145 proximal inlet port 144 of catalytic converter 140 and a second or outlet oxygen sensor 156 is provided along conduit 195 proximal outlet port 146. Oxygen sensor 155 measures the concentration of oxygen in the fluids flowing into catalytic converter 140 and oxygen sensor 156 measures the concentration of oxygen in the fluids exiting catalytic converter 140. In general, oxygen sensors 155, 156 can be any suitable type of oxygen sensor known in the art for measuring the concentration of oxygen in a flowing fluid including, without limitation, a zirconia oxide oxygen sensor, or the like. As will be described in more detail below, a comparison of the concentration of oxygen entering catalytic converter 140 and the concentration of oxygen exiting catalytic converter 140 can be used to monitor the operation of catalyst 147 within chamber 143.

Referring again to FIG. 1, a flame arrestor 196 is disposed along outlet conduit 195 proximal catalytic converter 140 and a liquid trap 197 is coupled to end 195b of outlet conduit 195. Flame arrestor 196 allows the fluids exiting catalytic converter 140 to pass therethrough but extinguishes any flames moving through conduit 195 to reduce the potential for fires and explosions in connection with system 100. In general, flame arrestor 196 can be any suitable device known in the art for preventing flames from passing therethrough including, without limitation, a deflagration arrester, a flame trap, or the like.

Liquid trap 197 receives and captures liquid condensate in outlet conduit 195. In particular, outlet conduit 195 includes a vertical section extending upward from outlet end 195b. Liquid trap 197 is disposed at the bottom of the vertical section, coupled to end 195b as previously described. The fluids exiting catalytic converter 140 into conduit 195 include un-combusted oxygen and combustion products carbon dioxide and water. Due to the relatively high temperatures in combustion device 110 and catalytic converter 140, the water entering outlet conduit 195 at inlet end 195a is typically in vapor phase. However, as the water vapor flows through conduit 195, it cools and may condense. Any condensed liquid water in conduit 195 flows under the force of gravity down the vertical section of conduit 195 and into trap 197. Liquids outlet conduit 190 extends vertically downward from trap 197, and more specifically, has an inlet end 190a coupled to the bottom of trap 197 within housing 150 and an outlet end 190b disposed below inlet end 190a outside housing 150. A valve 191 is disposed along liquids outlet conduit 190 outside housing 150 proximal end 190b. Thus, when valve 191 is open, liquids received and captured by trap 197 can flow under the force of gravity down liquids outlet conduit 190 and valve 191 to outlet end 190b.

Gas outlet conduit 180 receives gases flowing through outlet conduit 195 and vents the gases to the atmosphere. In particular, gas outlet conduit 180 has an inlet end 180a coupled to fluids outlet conduit 195 proximal end 195b within housing 150 and an outlet end 180b outside housing 150. In this embodiment, gas outlet conduit 180 extends laterally and horizontally from conduit 195 and then vertically upward toward end 180b, which comprises a gooseneck or 180° bend. This geometry reduces and/or prevents condensate and liquids from exiting system 100 via gas outlet conduit 180 as any condensate or liquids within conduit 180 will fall under gravity through the vertical section and then flow along the lateral section back to fluids outlet conduit 195 and liquid trap 197.

Figure 3:
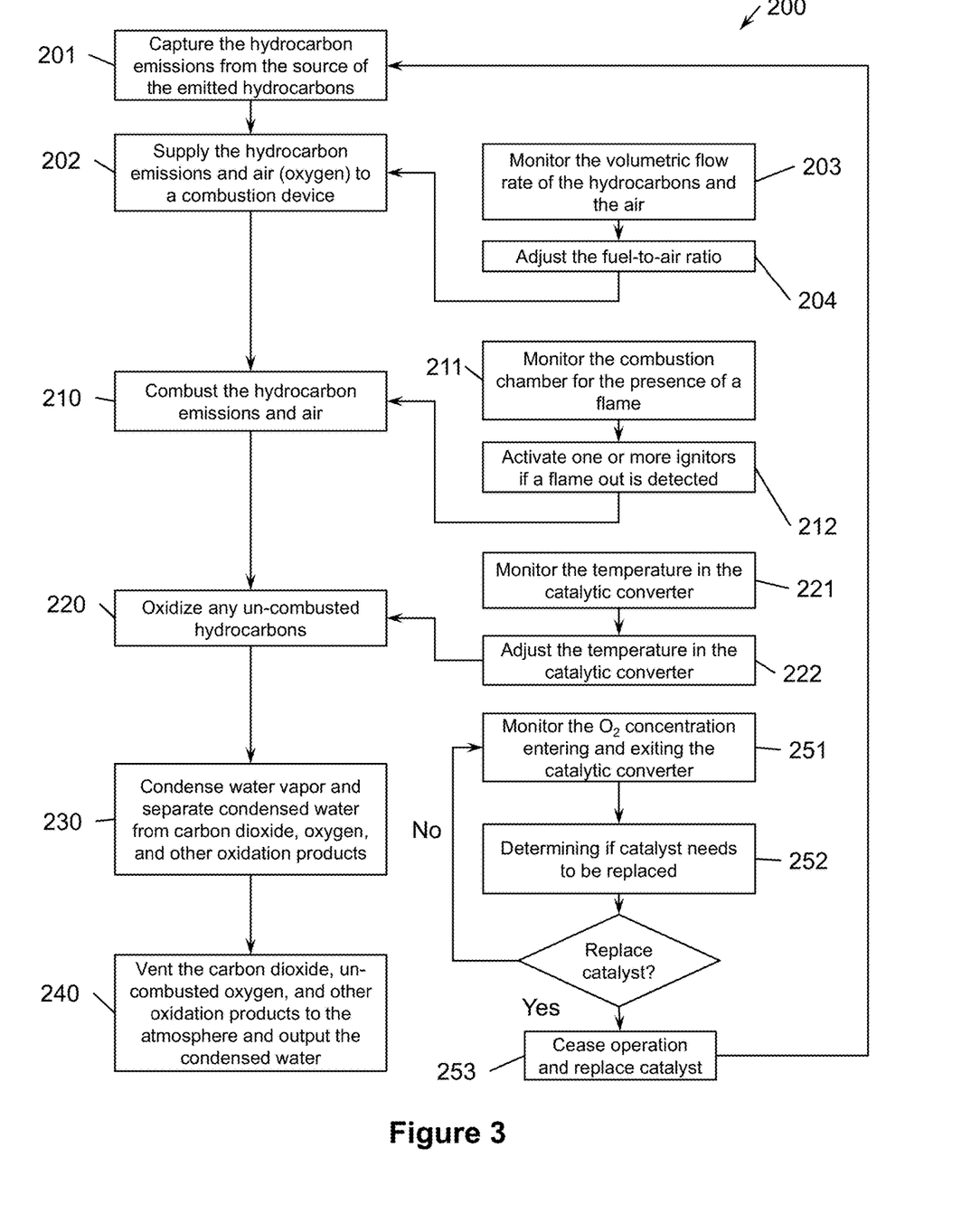
FIG. 3 is a flowchart illustrating an embodiment of a method for reducing and/or preventing hydrocarbon emissions from venting to the atmosphere in accordance with the principles described herein.

Referring now to FIGS. 1 and 3, an embodiment of a method 200 for reducing and/or preventing the release of hydrocarbon emissions into the atmosphere is shown. In the description to follow, method 200 is implemented with system 100 previously described and shown in FIG. 1.

Beginning in block 201, method 200 includes capturing the intermittently and/or continuously emitted hydrocarbons 106 from source 105. Next, in block 202, the captured hydrocarbon emissions and oxygen are directed and flowed to a system 100. In particular, the captured hydrocarbons emissions are directed into and flow through conduit 160 and diffuser 121 into combustion chamber 113 of combustion device 110. Air, which contains oxygen, flows through conduit 170 into combustion chamber 113 of combustion device 110. It should also be appreciated that the use of pressurized air (flowed through air conduit 170) ensures a controllable, continuous and steady flow of air through conduit 170 that can be adjusted with choke 171. While the hydrocarbons and air are supplied to the combustion chamber 113, the volumetric flow rate of the hydrocarbons and air are monitored by flow meters 162, 172, respectively, in block 203, and choke valves 161, 171, respectively, are adjusted to achieve a desired and pre-determined fuel-to-air ratio within combustion chamber 113 that is expected to achieve complete or substantially complete combustion in block 204. In general, the desired fuel-to-air ratio can be determined using techniques known in the art according to the composition of the emitted hydrocarbons, which is known, estimated, and/or predicted based on the source of the hydrocarbon emissions. For example, if the hydrocarbon emissions are hydrogen (H2) rich, then the desired fuel-to-air ratio is 1:10; if the hydrocarbon emissions are methane (CH4) rich, then the desired fuel-to-air ratio is 1:12; if the hydrocarbon emissions are ethane (C2H6) rich, then the desired fuel-to-air ratio is 1:14; if the hydrocarbon emissions are propane (C3H8) rich, then the desired fuel-to-air ratio is 1:18; and if the hydrocarbon emissions includes 20 vol % or more of butane (C4H10) mixed with hydrogen (H2), methane, ethane, and propane, then the desired fuel-to-air ratio is 1:20. Choke valves 161, 171 are preferably adjusted to achieve the desired fuel-to-air ratio, which in turn preferably yields a combustion efficiency of at least 90%, and more preferably greater than 93%. As will be described in more detail below, any hydrocarbons that are not combusted in block 204 are removed in block 220 via catalyst 147.

Referring still to FIGS. 1 and 3, and moving now to block 210, the hydrocarbons and oxygen (in the air) are combusted in combustion chamber 113. As previously described, the fuel-to-air ratio is adjusted to achieve complete or substantially complete combustion. During normal operations, the continuous or near continuous combustion of hydrocarbons and oxygen in combustion chamber 113 results in a continuous flame within combustion chamber 113. The presence of the flame within combustion chamber 113 is monitored in block 211. In particular, the temperature in combustion chamber 113 is monitored with temperature sensor 127a to determine whether the temperature within chamber 113 is at or above the combustion temperature, thereby indirectly determining whether a flame is present in chamber 113. In general, the combustion temperature can be determined using techniques known in the art according to the fuel-to-air ratio and the composition of the emitted hydrocarbons, which is known, estimated, and/or predicted based on the source of the hydrocarbon emissions. A measured temperature in combustion chamber 113 that is below the combustion temperature indicates there may a flame out (i.e., no flame or associated combustion in chamber 113). In addition, in this embodiment, optical flame detector 127b directly and optically monitors chamber 113 to determine whether a flame is present within chamber 113. Although temperature sensor 127a and optical flame detector 127b are both used to detect the presence of a flame in chamber 113 in this embodiment, in other embodiments, the presence of a flame within chamber 113 may be determined via temperature sensor 127a alone or optical flame detector 127b alone.

Moving now to block 212, if temperature sensor 127a and/or optical flame detector 127b determine there is a flame out in chamber 113, one or more ignitors 123 are activated and remain on until a flame is established in combustion chamber 113 as indicated by temperature sensor 127a (e.g., the temperature in chamber 113 measured by sensor 129a is at or above the combustion temperature) and/or optical flame detector 127b (e.g., optically detects a flame in chamber 113). Due to residual heat in combustion device 110, there may be a delay between a flame out and when the temperature in chamber 113 drops sufficiently for temperature sensor 129a to detect the flame out. However, inclusion of optical flame detector 127b in this embodiment offers the potential to reduce any delays between an actual flame out and re-establishment of combustion as detector 127b can identify a flame out almost immediately. During any such delays and until combustion is re-established with ignitors 123, hydrocarbons may pass through combustion device 110 without being combusted.

Referring still to FIGS. 1 and 3, although measures are taken to achieve complete or substantially complete combustion, some hydrocarbons may survive combustion chamber 113 (i.e., not be combusted within combustion chamber 113). To minimize and/or prevent the inadvertent release of any un-combusted hydrocarbons into the atmosphere, the combustion products from combustion chamber 113, any un-combusted hydrocarbons, and any un-combusted oxygen are supplied to catalytic converter 140 where the un-combusted hydrocarbons are oxidized in the presence of catalyst 147 in block 220, thereby effectively eliminating the un-combusted hydrocarbons. During oxidation of the un-combusted hydrocarbons, the temperature in chamber 143 is monitored with temperature sensor 154 in block 221, and the temperature of chamber 143 is adjusted with heaters 153 in block 222 to achieve a desired temperature of chamber 143 to optimize oxidation of the un-combusted hydrocarbons by catalyst 147. In general, the desired temperature of chamber 143 can be determined using techniques known in the art according to the composition of the emitted hydrocarbons and the type of catalyst 147. The composition of the emitted hydrocarbons may be known, estimated, and/or predicted based on the source of the hydrocarbon emissions.

Next, the combustion products, un-combusted oxygen, and oxidation products exit catalytic converter 140 and flow through fluids outlet conduit 195. In general, the combustion products include water vapor and carbon dioxide. The oxidation products depend on the composition of the hydrocarbons, but will often include water vapor, nitrogen (N2), and carbon dioxide (CO2). In block 230, the water vapor cools and condenses as it flows through conduit 195, thereby separating the liquid water from the carbon dioxide, un-combusted oxygen, and other oxidation products. Moving now to block 240, as previously described, the condensed, liquid water is captured by liquid trap 197 and exits system 100 via liquid outlet conduit 190, while the carbon dioxide, any un-combusted oxygen, and other oxidation products flow through gas outlet conduit 180 and are vented to the atmosphere.

Referring still to FIGS. 1 and 3, during oxidation of the un-combusted hydrocarbons by catalytic converter 140 in block 220, the concentration of oxygen ($O_2$) entering catalytic converter 140 and the concentration of oxygen (O₂) exiting catalytic converter 140 are monitored by oxygen sensors 155, 156, respectively, in block 251. Comparisons of the oxygen concentration in the fluids flowing from combustion device 110 into catalytic converter 140 (as measured by sensor 155) and the oxygen concentration in the fluids exiting catalytic converter 140 into fluids outlet conduit 195 (as measured by sensor 156) over time can be used to determine the efficacy and operation of catalyst 147 in block 252 (e.g., determine when catalyst 147 is at or approaching the end of its useful life). More specifically, the oxidation of un-combusted hydrocarbons in catalytic converter 140 results in the consumption of oxygen in catalytic converter 140. Thus, it is expected that the concentration of oxygen exiting catalytic converter 140 will be less than the concentration of oxygen entering catalytic converter 140. Without being limited by this or any particular theory, assuming all other operating parameters are constant or substantially constant over time (e.g., the composition of the hydrocarbons supplied by conduit 160 are uniform or substantially uniform, the degree of combustion in combustion device is constant or substantially constant over time, the volumetric flow rate of oxygen and the hydrocarbons through conduits 160, 170, respectively, are substantially constant, etc.), the decrease in the concentration of oxygen within catalytic converter 140 will be constant or substantially constant over time. The ability of catalyst 147 to facilitate oxidation of un-combusted hydrocarbons generally decreases over time, and thus, as catalyst 147 approaches the end of its useful life, the decrease in the concentration of oxygen within catalytic converter 140 lessens—less oxygen is consumed in catalytic converter 140, and thus, the concentration of oxygen exiting catalytic converter 140 increases relative to the concentration of oxygen entering catalytic converter 140 over time. At a pre-determined degree of decrease in the concentration of oxygen, the operator can be notified (e.g., via audible and/or visual alarm) and can determine whether to replace the catalyst 147 in block 252. For example, if the concentration of oxygen exiting catalytic converter 140 (as measured by sensor 156) is 30% less than the concentration of oxygen entering catalytic converter 140 (as measured by sensor 155) with a new catalyst 147 and system 100 operating under steady state conditions, the operator may be notified for instance when the concentration of oxygen exiting catalytic converter 140 is only 20% less than the concentration of oxygen entering catalytic converter 140.

If the catalyst 147 is to be replaced, the flow of hydrocarbons to combustion device 110, combustion in combustion device 110, and oxidation of un-combusted hydrocarbons in catalytic converted are ceased, and catalyst 147 is replaced according to block 253. On the other hand, if there is no discernable decrease in the concentration of oxygen between outlet port 146 and inlet port 144, the decrease in the concentration of oxygen is below the pre-determined degree of decrease, or the operator determines catalyst 147 does not need to be replaced, then operations continue and catalyst 147 is not yet replaced.

Figure 4:
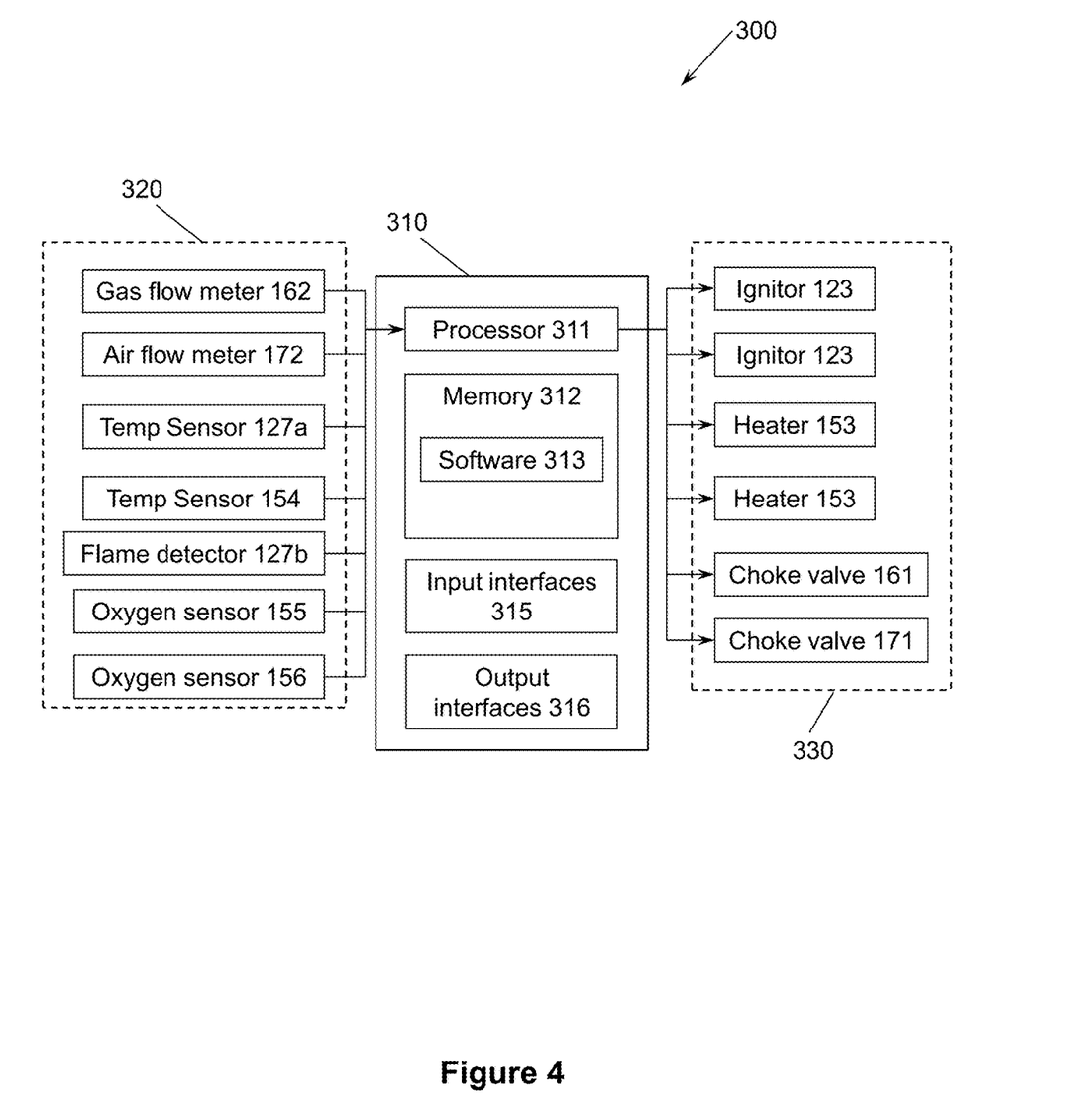
FIG. 4 is a schematic view of an embodiment of a system for monitoring and controlling the hydrocarbon emission management system of FIG. 1 in accordance with the principles described herein.

Referring now to FIG. 4, an embodiment of a control system 300 for monitoring and operating system 100 according to method 200 is shown. In this embodiment, control system 300 includes a computing device 310, a plurality of input devices 320, and a plurality of output devices 330. Input devices 320 supply measured data to computing device 310, and computing device 310 controls output devices 330 based on the measured data supplied by input devices 320. Input devices 320 include flow meters 162, 172, temperature sensors 127a, 154, optical flame detector 127b, and oxygen sensors 155, 156 as previously described shown in FIGS. 1 and 2, and the output devices 330 include ignitors 123, heaters 153, and choke valves 161, 171 as previously described shown in FIGS. 1 and 2.

Computing device 310 includes a processor 311 (e.g., microprocessor, central processing unit, or collection of such processor devices, etc.), memory 312, one or more input interface(s) 315 (e.g., keyboard, mouse, etc.), and one or more output interface(s) 316 (e.g., monitor, audible alarm, visual alarm, etc.). Processor 311, memory 312, and interface(s) 315, 316 are coupled to a system BUS that allows the transmission of electronic signals therebetween. Interfaces 315 allow an operator of computing device 310 to enter data into computing device 310 and interfaces 316 supply information to the operator of computing device 310. Processor 311 executes software 313 (e.g., machine-readable instructions) provided on memory 312. Memory 312 can store data communicated by input devices 320 and the results of processing executed by processor 311, as well as store the software 313 to be executed by processor 311. Memory 312 may comprise volatile storage (e.g., random access memory), non-volatile storage (e.g., flash storage, read only memory, etc.), or combinations of both volatile and non-volatile storage. Data consumed or produced by the machine-readable instructions can also be stored on memory 312. The software 313 may comprise non-transitory computer readable medium.

Computing device 310 receives measured data from input devices 320 and controls output devices 330 in response to the measured data. In particular, flow meters 162, 172 measure the volumetric flow rate of the hydrocarbons and air into combustion device 110, respectively, and communicate those measurements to computing device 310; temperature sensors 127a, 154 measure the temperature in combustion device 110 and catalytic converter 140, respectively, and communicate those measurements to computing device 310; optical flame detector 127b determines whether a flame is present in combustion device 110 and communicates that data to computing device 310; and oxygen sensors 155, 156 measure the concentration of oxygen in the fluids entering catalytic converter 140 and exiting catalytic converter 140, respectively, and communicate those measurements to computing device 310. Using processor 311 and memory 312, computing device 310 adjusts ignitors 123, heaters 153, and choke valves 161, 171 based on the measured data as previously described with respect to method 200. Namely, computing device 310 adjusts ignitors 123 to control the temperature within combustion chamber 113 and to ensure the presence of a flame, and adjusts choke valves 161, 171 to control the fuel-to-air ratio in combustion chamber 113 to ensure complete or near-complete combustion of the hydrocarbons and oxygen supplied to combustion chamber 113. The desired temperature (or temperature range) within combustion chamber 113 and the desired fuel-to-air ratio (or desired fuel-to-air ratio range) can be determined using techniques known in the art based on the composition of the hydrocarbons (known or predicted). Measurements from temperature sensor 127a and flow meters 162, 172 can also be used to monitor the temperature and fuel-to-air ratio in combustion chamber 113 over time to ensure they remain within desirable and acceptable ranges. In addition, computing device 310 adjusts heaters 153 to ensure the temperature in chamber 143 (as measured by temperature sensor 154) is sufficient for oxidation of the hydrocarbons that are not combusted in combustion chamber 113. The desired temperature (or temperature range) within chamber 143 can be determined using techniques known in the art based on the composition of the hydrocarbons (known or predicted) and the composition of catalyst 147. Measurements from temperature sensor 154 can also be used to monitor the temperature in chamber 143 over time to ensure it remains within a desirable and acceptable range. Still further, computing device 310 can inform a user or operator (e.g., by triggering a visual and/or audible alarm) when catalyst 147 is approaching the end of its useful life based on measurements supplied by oxygen sensors 155, 156. As previously described, a comparison of the concentration of oxygen measured by sensor 156 at outlet port 146 to the concentration of oxygen measured by sensor 155 at inlet port 144 can be used to determine whether the concentration of oxygen passing through catalytic converter 140 is decreasing by at least a predetermined degree. When the degree of decrease in the concentration of oxygen is at or below the predetermined degree, which may be pre-determined and input into computing device 310 by a user or operator, computing device 310 can inform the user or operator that catalyst 147 be replaced.

In the manner described, embodiments of systems and methods disclosed herein can be used to reduce and/or eliminate the release of hydrocarbon emissions into the atmosphere. In addition, embodiments of individual systems described herein are "scalable" to accommodate intermittent and continuous flows of hydrocarbon emissions, as well as varying volumetric flow rates of hydrocarbon emissions, thereby reducing and/or eliminating the complexities and costs associated with the use of multiple independent devices to manage hydrocarbon emissions. In particular, embodiments described herein employ a two-step process to reduce hydrocarbons—high temperature combustion and lower temperature oxidation. The use of pressurized air to supply air conduit 170 facilitates the ability to provide the proper, desired fuel-to-air ratio to ensure complete or substantially complete combustion. In addition, catalyst 147 in catalytic converter 140 is heated by the exhaust temperature of the fluids exiting combustion chamber 113, as well as heaters 153, to ensure oxidation in catalytic converter 140. For example, in one exemplary embodiment described herein that was built and tested, 7.9 liters per minute of methane gas was processed (eliminated) at a BTU throughput of about 14,232 BTU per hour and an air consumption of 67 liters per minute, and 2.64 liters per minute of propane gas was processed (eliminated) at a BTU throughput of 14,403 BTU per hour and an air consumption of 26 liters per minute.

Further, embodiments of systems and methods described herein include several "intelligent" features to ensure complete or substantially complete combustion, and to monitor the performance and efficacy of the catalyst. The information related to the catalyst can be used to schedule replacement of the catalyst when it is approaching the end of its useful operating life, thereby avoiding the cost and downtime associated with overly frequent replacement of the catalyst.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for reducing the release of hydrocarbons intermittently or continuously emitted from a hydrocarbon source into the atmosphere, the system comprising:
   a hydrocarbon supply conduit having an inlet end and an outlet end, wherein the inlet end is configured to receive the emitted hydrocarbons from the hydrocarbon source;
   an air supply conduit having an inlet end configured to be coupled to an air source and an outlet end;
   a combustion device coupled to the outlet end of the hydrocarbon supply conduit and the outlet end of the air supply conduit, wherein the combustion device is configured to receive the hydrocarbons from the hydrocarbon supply conduit and the air from the air supply conduit, and wherein the combustion device is configured to ignite and combust the hydrocarbons;
   a catalytic converter spaced apart from the combustion device;
   a transfer conduit extending from an outlet of the combustion device to an inlet of a catalytic converter, wherein the catalytic converter is configured to receive the combustion products and any un-combusted hydrocarbons from the transfer conduit, and wherein the catalytic converter includes a catalyst configured to oxidize the un-combusted hydrocarbons;
   a fluids outlet conduit having an inlet end coupled to the catalytic converter; and an outlet end opposite the inlet end;
   a liquid outlet conduit coupled to the fluids outlet conduit and configured to receive liquid from the fluids outlet conduit; and
   a gas outlet conduit coupled to the fluids outlet conduit between the inlet end of the fluids outlet conduit and the liquids outlet conduit, wherein the gas outlet conduit is configured to receive gas from the liquids outlet conduit and vent the gas to the atmosphere.

2. The system of claim 1, further comprising:
   a first flow meter and a first choke valve disposed along the hydrocarbon supply conduit, wherein the first flow meter is positioned between the first choke valve and the outlet end of the hydrocarbon supply conduit;
   a second flow meter and a second choke valve disposed along the air supply conduit, wherein the second flow meter is positioned between the second choke valve and the outlet end of the air supply conduit;
   a gas diffuser disposed in the combustion device, wherein the gas diffuser has an open inlet end configured to receive the emitted hydrocarbons from the outlet end of the hydrocarbon supply conduit and a plurality of perforations configured to supply the emitted hydrocarbons from the gas diffuser into a combustion chamber of the combustion device; and
   wherein the first flow meter is configured to measure a flow rate of the hydrocarbons in the hydrocarbon supply conduit and the second flow meter is configured to measure a flow rate of the air in the air supply conduit;

wherein the first choke valve is configured to be adjusted to control the flow rate of the hydrocarbons in the hydrocarbon supply conduit and the second choke valve is configured to be adjusted to control the flow rate of the air in the air supply conduit to achieve a pre-determined air-to-fuel ratio of the hydrocarbons and the air in the combustion device.

3. The system of claim 2, further comprising:
an ignitor coupled to the combustion device and configured to ignite the hydrocarbons in a combustion chamber of the combustion device; and
a temperature sensor coupled to the combustion device and configured to measure the temperature in the combustion chamber.

4. The system of claim 3, further comprising:
a heater coupled to the catalytic converter and configured to adjust the temperature within the catalytic converter;
a temperature sensor coupled to the catalytic converter and configured to measure the temperature in the catalytic converter.

5. The system of claim 2, further comprising:
an inlet oxygen sensor coupled to the catalytic converter and configured to measure a concentration of oxygen proximal the inlet of the catalytic converter; and
an outlet oxygen sensor coupled to the catalytic converter and configured to measure a concentration of oxygen proximal an outlet of the catalytic converter.

6. The system of claim 1, further comprising:
a gas diffuser disposed in the combustion device, wherein the gas diffuser has an open inlet end configured to receive the emitted hydrocarbons from the outlet end of the hydrocarbon supply conduit and a plurality of perforations configured to supply the emitted hydrocarbons from the gas diffuser into a combustion chamber of the combustion device.

7. The system of claim 6, further comprising:
a first flow meter and a first choke valve disposed along the hydrocarbon supply conduit, wherein the first flow meter is positioned between the first choke valve and the outlet end of the hydrocarbon supply conduit;
a second flow meter and a second choke valve disposed along the air supply conduit, wherein the second flow meter is positioned between the second choke valve and the outlet end of the air supply conduit;
wherein the first flow meter is configured to measure a flow rate of the hydrocarbons in the hydrocarbon supply conduit and the second flow meter is configured to measure a flow rate of the air in the air supply conduit; and
wherein the first choke valve is configured to be adjusted to control the flow rate of the hydrocarbons in the hydrocarbon supply conduit and the second choke valve is configured to be adjusted to control the flow rate of the air in the air supply conduit to achieve a pre-determined air-to-fuel ratio of the hydrocarbons and the air in the combustion device.

8. The system of claim 7, wherein the pre-determined air-to-fuel ratio is configured to yield complete combustion of the hydrocarbons in the combustion device.

9. The system of claim 6, further comprising:
an ignitor coupled to the combustion device and configured to ignite the hydrocarbons in a combustion chamber of the combustion device; and
a temperature sensor coupled to the combustion device and configured to measure the temperature in the combustion chamber.

10. The system of claim 9, further comprising:
a heater coupled to the catalytic converter and configured to adjust the temperature within the catalytic converter;
a temperature sensor coupled to the catalytic converter and configured to measure the temperature in the catalytic converter.

11. The system of claim 6, further comprising:
an inlet oxygen sensor coupled to the catalytic converter and configured to measure a concentration of oxygen proximal the inlet of the catalytic converter; and
an outlet oxygen sensor coupled to the catalytic converter and configured to measure a concentration of oxygen proximal an outlet of the catalytic converter.

12. The system of claim 6, wherein the combustion device and the catalytic converter are disposed in a housing.

* * * * *